United States Patent [19]

Kaijima et al.

[11] Patent Number: 4,954,984
[45] Date of Patent: Sep. 4, 1990

[54] METHOD AND APPARATUS FOR SUPPLEMENTING TRANSLATION INFORMATION IN MACHINE TRANSLATION

[75] Inventors: Ryota Kaijima, Tokyo; Hirokazu Ihara, Machida; Yoshihiko Nitta, Sagamihara; Hiroyuki Kaji, Tama, all of Japan

[73] Assignee: Hitachi, Ltd., Tokyo, Japan

[21] Appl. No.: 827,539

[22] Filed: Feb. 10, 1986

[30] Foreign Application Priority Data

Feb. 12, 1985 [JP] Japan .................................. 60-24623

[51] Int. Cl.⁵ ............................................. G06F 15/38
[52] U.S. Cl. ................................. 364/900; 364/920.4; 364/943.0; 364/948.2; 364/419
[58] Field of Search ............... 364/419, 200 MS File, 364/900 MS File; 434/156, 157, 167

[56] References Cited

U.S. PATENT DOCUMENTS

| | | | |
|---|---|---|---|
| 4,502,128 | 2/1985 | Okajima et al. | 364/900 |
| 4,542,478 | 9/1985 | Hashimoto et al. | 364/900 |
| 4,584,667 | 4/1986 | Hashimoto et al. | 364/900 |
| 4,586,160 | 4/1986 | Amano et al. | 364/900 |
| 4,594,686 | 6/1986 | Yoshida | 364/900 |
| 4,599,612 | 7/1986 | Kaji et al. | 340/723 |
| 4,599,691 | 7/1986 | Sakaki et al. | 364/419 |
| 4,641,264 | 2/1987 | Nitta et al. | 364/900 |
| 4,661,924 | 4/1987 | Okamoto et al. | 364/900 |
| 4,685,060 | 8/1987 | Yamano et al. | 364/419 |
| 4,703,425 | 10/1987 | Muraki | 364/419 |
| 4,730,270 | 3/1988 | Okajima et al. | 364/900 |
| 4,775,956 | 10/1988 | Kaji et al. | 364/900 |

Primary Examiner—Careth D. Shaw
Assistant Examiner—Maria Napiorkowski
Attorney, Agent, or Firm—Antonelli, Terry, Stout & Kraus

[57] ABSTRACT

In machine translation from a first language text such as a Japanese text to a second language text such as an English text, if information necessary for the translation is not directly expressed or is not sufficiently hinted at in the first language text, such information is requested by the translation machine to supplement the first language during inputting of the first language text or pre-editing thereof.

25 Claims, 5 Drawing Sheets

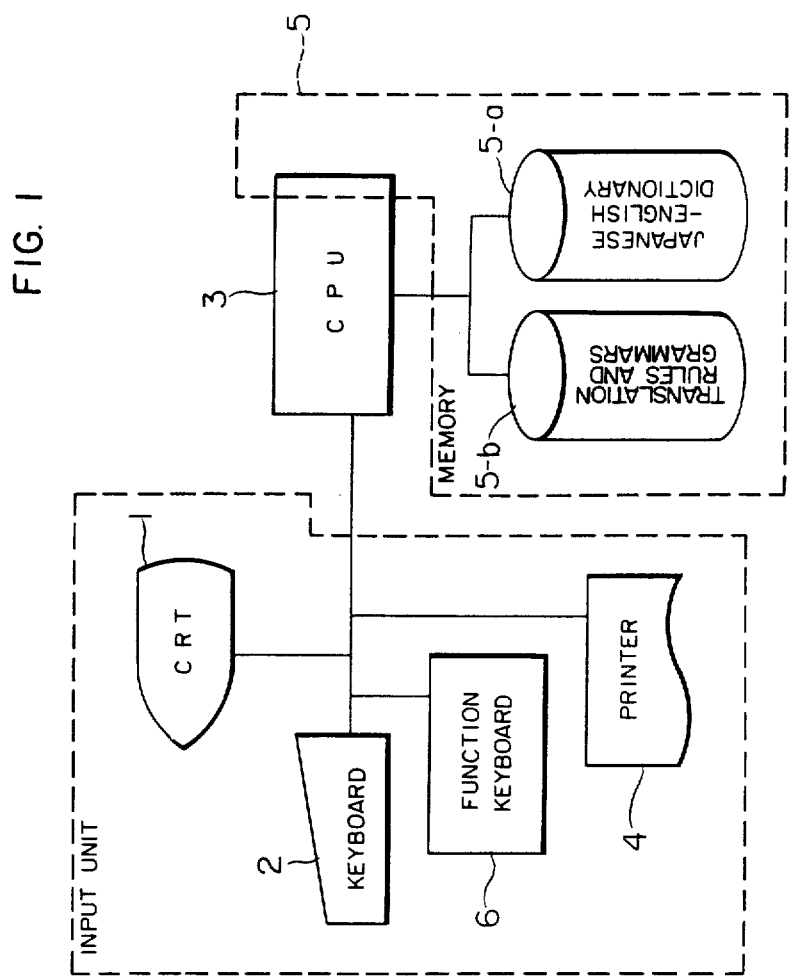

FIG. 2

| WORK MODE | 10 | 11 JAPANESE INPUT | 21 | 12 ENGLISH OUTPUT | 22 | 13 DICTIONARY | 23 |
|---|---|---|---|---|---|---|---|
| STYLE MODE | 20 | | | MANUAL 311 | ORDINARY 313 | (SPARE) 314 | |
| NOUN | | 310 | | 312 | | | (SPARE) |
| KA | | INDEFINITE 320 | PLURAL 321 | ALTERNATIVE 322 | INTERROGATIVE 333 | EXCLAMATION 334 | |
| GA | | NOMINATIVE 330 | 331 | OBJECTIVE 332 | CONJUNCTION 343 | COUNTER-CONJUNCTION 344 | |
| KARA | | START POINT 340 | 341 | LARGER THAN 342 | CONDITION 353 | REASON 354 | |
| DAKE | | DEFINITE 350 | 351 | DEGREE 352 | PROPORTIONAL | EMPHASIS | |

JAPANESE INPUT SUPPLEMENTARY INFORMATION

300 INDEX

ILLUMINATED FUNCTION KEY AREA (Labels visible: MALE 323, FEMALE 324)

FIG. 3b

| INPUT OF JAPANESE TEXT | MEANING |
|---|---|
| A. 1-ko no [neji] de futa wo koteisuru | Fix a cover with one [screw] |
| B. [Neji] 4-ko de futa wo koteisuru | Fix a cover with four [screws] |
| C. Enjin kara [supaaku puragui] wo nukitoru | Remove [spark plugs] from an engine |

FIG. 4b

| INPUT OF JAPANESE TEXT | MEANING |
|---|---|
| D. Jidousha ga hashiru | (a car ga run) |
| E. Jidousha ga hoshii | ((I) ga want a car) |
| F. Jidousha wo hoshii ga kaigairyokou mo shitai | (I want a car ga I want to go abroad) |
| G. Jidousha wa hoshii ga okane ga nai | (I want a car ga I have no money) |

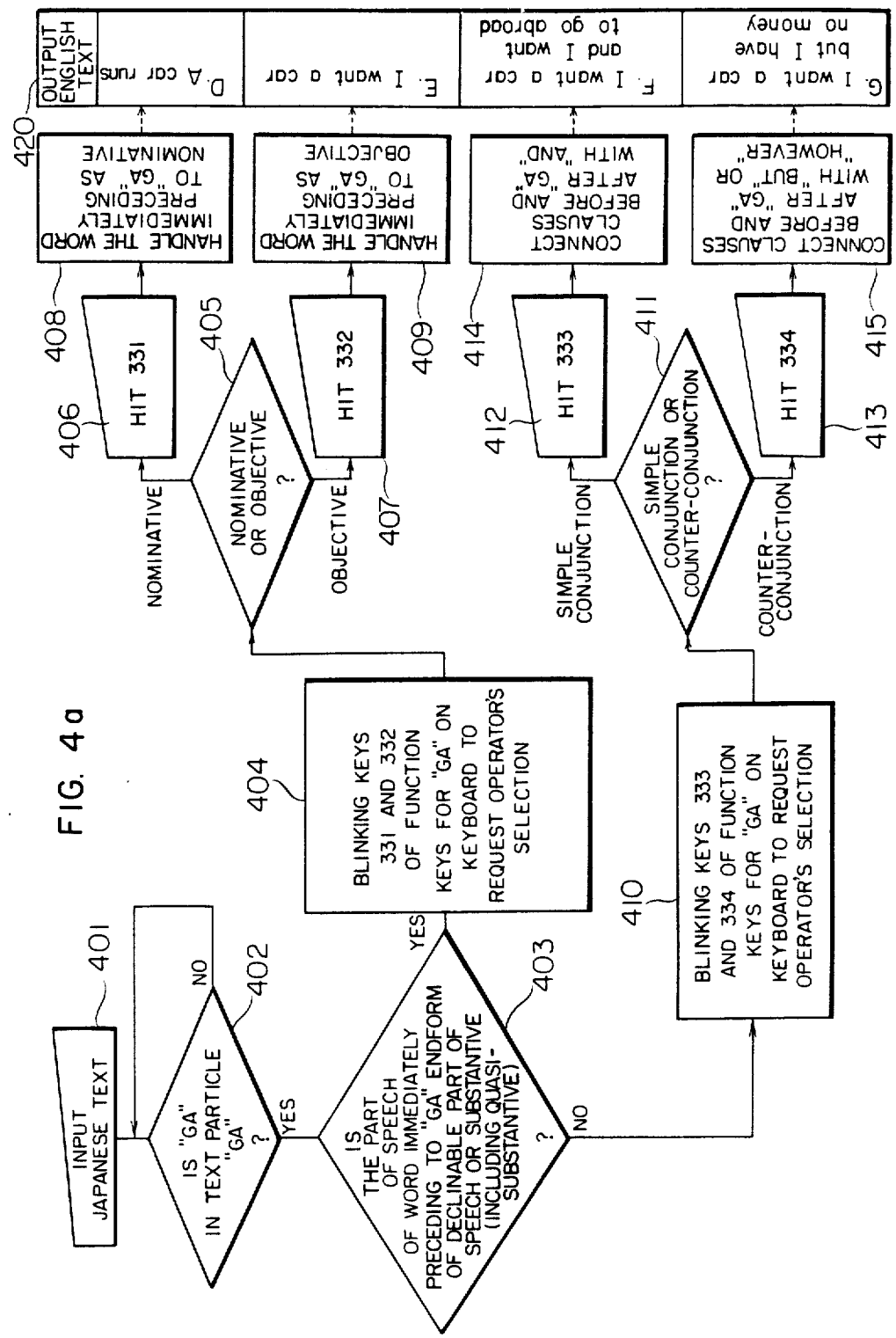

ical manual 21, ordinary 22 and spare 23 are arranged. For the noun 310 of the Japanese input auxiliary information 300, a function

METHOD AND APPARATUS FOR SUPPLEMENTING TRANSLATION INFORMATION IN MACHINE TRANSLATION

CROSS REFERENCES

The present invention is related to Ser. No. 662850 filed on Oct. 19, 1984 and Ser. No. 760918 filed on July 31, 1985, both assigned to the assignee of the present application.

BACKGROUND OF THE INVENTION

The present invention relates to a method for supplementing translation information required in a machine translation between two languages having different linguistics. For example, a method is provided for supplementing translation information which is suitable to supplement information to Japanese text in Japanese-English machine translation, when such the information is not directly expressed in the Japanese text but necessary in the translation process.

The machine translation primarily aims at saving manpower in translation work. A smaller amount of manpower is always required in inputting original text to a computer, and post-editing the output of the translation text. The inputting and the post-editing are usually carried out with a word processor or a terminal device having such a function. Accordingly, we can say that the manpower corresponds to the number of key strokes on the keyboard by an operator.

For example, in a Japanese-English machine translation, there are several kinds of information on Japanese text which is sometimes eliminated from Japanese text which the translation machine will find inconvenient for generating idiomatic English English text. Examples of this are identifying singular or plural forms of a noun, selection of definite or indefinite article and indicating a sex. In the past, these were corrected in the post-editing stage, by hand or in correction on the Japanese text prior to the translation (pre-editing) by adding a suffix or note to instruct the machine that a noun is of plural form. For example, words such as "tachi", "nado" or "−S (fuku)" can be added to Japanese nouns which should be treated as a plural form. In the post-edit correction, if the plural form noun is included in a main clause, not only the correction of the noun to the plural form but also correction on conjugation of the related verb must be made. Usually the minimum correction to a simple sentence at the post-editing requires 10–20 key-strokes and even the supplementing information at the pre-editing requires at least 10 key-strokes.

SUMMARY OF THE INVENTION

It is an object of the present invention to provide a method for supplementing translation information to for machine translation, so that ambiguity in an input text is eliminated by a simple operation on keyboard at pre-editing so that quality and accuracy of an output translation text are improved.

It is another object of the present invention to provide a function to add information which is inherently omitted from a first language but necessary to generate the second language correctly in the machine translation. It is another object of the present invention to add a function of the machine translation which eliminates direct correction at post-editing such as correction of a noun in a translated second language to pluralize the noun, and also eliminates indirect correction such as clarification of an indefinite article conjugation and pluralizing of pronoun due to such the pluralizing the noun.

It is a further object of the present invention to reduce the number of key-strokes required in supplementing information in translation between two languages having different linguistics.

In order to achieve the above mentioned objects, in the machine translation from the first language such as Japanese or Chinese to the second language such as English, German or French, when information which is not directly expressed in the first language text is necessary in generating the second language text, this information is given to the first language text during the inputting of the first language text (e.g. during pre-editing).

BRIEF DESCRIPTION OF THE DRAWINGS

FIG. 1 shows a configuration of a machine translation system to which the present invention is applied, FIG. 2 shows an idea of key arrangement of a function keyboard for supplementing translation information which is a unique feature of the present invention, FIG. 3a is a flow chart of supplementing translation information regarding the singular/plural form of a noun using a function key of FIG. 2, while FIG. 3b illustrates English meanings for input Japanese text, and FIG. 4 is a flow chart for supplementing translation information for a Japanese particle "ga" by using a function key of FIG. 2, while FIG. 4b illustrates English meanings for input Japanese text.

DESCRIPTION OF THE PREFERRED EMBODIMENTS

Figure 3A:
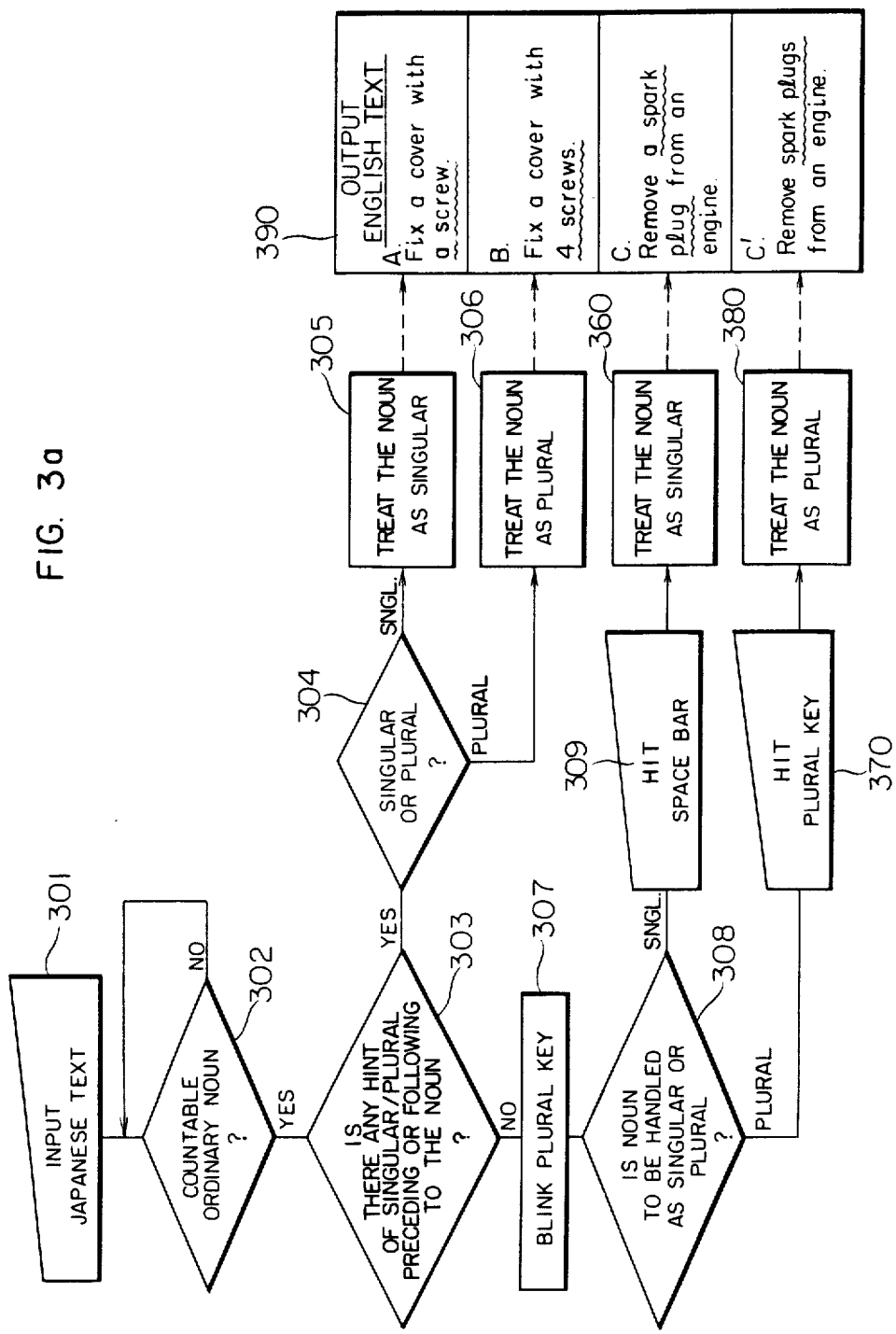

In the following embodiment, translation from a Japanese text (the first language) to an English text (the second language) is explained.

FIG. 1 shows a configuration of a machine translation system to which the present invention is applied.

Numeral 1 denotes a CRT on which an input Japanese text and an output English text re displayed, numeral 2 denotes a keyboard by which the Japanese text is inputted, numeral 3 denotes a CPU which processes the translation and controls peripheral devices, numeral 4 denotes a printer which prints out the translation result, numeral 5 denotes a memory which stores various data, that is a Japanese-English dictionary 5a which includes translated English words and information and a translation information memory 5b which includes translation rules and grammars necessary in the language translation. Numeral 6 denotes a function keyboard, a main part of the present invention, having function keys by which the translation information is given.

FIG. 2 shows an embodiment of a key arrangement of the function keyboard 6. The function keyboard for adding the translation information consists of an index area and an illuminated function key area. The index area contains labels of a work mode 10, style mode 20 and Japanese input auxiliary information 300. The label of Japanese input auxiliary information 300 comprises labels such as noun 310, "ka" 320, "ga" 330, "kara" 340 and "dake" 350. For the label of work mode 10, work mode select keys including Japanese text input 11, translated English output 12 are dictionary for maintenance and reference 13 are arranged. For the style mode 20, style select keys including technical manual 21, ordinary 22 and spare 23 are arranged. For the noun 310 of the Japanese input auxiliary information 300, a function key to instruct pluralizing of an ordinary noun (hereinafter called a plural-key) 311, male key 312 and female key 313 for designating male and female of the person in the text, and a spare key 314 are arranged. For the label "ka" 320, selection keys of meaning including indefinite 321, alternative 322, interrogative 333 and exclamation 324 are arranged. For the particle "ga" 330, selection keys of meaning including nominative 331, objective 332, conjunction 333 and counter conjunction 334 are arranged. For the label "kara" 340, selection keys of meaning including nominative 331, objective 332, conjunction 333 and counter conjunction 334 are arranged. For the label "kara" 340, selection keys of meaning including starting point 341, larger than 342, condition 343 and reason 344 are arranged. For the label "dake" 350, selection keys of meaning including limitation 351, degree 352, proportion 353 and emphasis 354 are arranged. For other Japanese particles, keys are arranged in a similar manner.

FIG. 3a is a flow chart for supplementing translation information for a noun by using the plural-key 311 of FIG. 2.

A Japanese text is inputted by input devices such as a keyboard, a magneto-optical character reader or a voice recognition input device (step 301). The CPU 3 analyzes the Japanese text by using the Japanese-English English dictionary 5a and Japanese text analyzing program in translation rules and grammers 5b stored in the memory 5 of FIG. 1 to determine whether a noun in the Japanese text is a countable ordinary noun or an uncountable one in English (step 302). English nouns are stored in the Japanese-English dictionary 5a together with this information. If the noun is determined to be a countable ordinary noun, the existence of a direct hint to singular/plural preceeding to or following to the noun is checked (step 303). If there is such a hint, whether the hint indicates a singular state of the noun or a plural state of the noun is checked (step 304). If the hint is for a singular, the noun is treated as the singular (a singular form of noun is selected) (step 305) and an English noun equivalent to the word is outputted in a singular form (See "a screw" in Example A). If the hint indicates a plural of the noun, such the noun is treated as the plural (a plural form of noun is selected from the Japanese-English dictionary 5a) (step 306) and an English noun equivalent to the word is outputted in plural form (See "screws" in Example B). In the step 303, if the machine recognizes that there is no hint to singular or plural of the noun preceeding to or following to the noun, the plural-key is blinked (step 307). Thus, an operator determines whether the noun should be treated as singular or plural by interpreting the sentence (step 308). If it should be treated as singular, the operator hits a space bar or "1" numerical key (step 309) to treat the noun as singular (step 360). Then, an English word equivalent to the noun is outputted in singular form (See "a spark plug" in Example C). When the noun is to be treated as plural, the operator hits the blinking plural key or "2" numerical key (step 370) to treat the noun as plural (step 380). Then, an English word equivalent to the noun is outputted in plural form (See "spark plugs" in Example C').

FIG. 4a is a flow chart of supplementing the translation information for the particle "ga" in Japanese text by using the function keys of FIG. 2.

A Japanese text is inputted (step 401). The CPU 3 analyzes the Japanese text by using the Japanese-English dictionary 5a and the Japanese text analysis program stored in the translation rules and grammer memory 5b in the memory 5 of FIG. 1 to determine a part of speech of "ga" in the Japanese text (step 402). If it is recognized that "ga" is a particle, then whether a word immediately before the "ga" is a substantive part of speech (including a quasi-substantive part of speech) or an end-form of a declinable word is checked (step 403). If the immediately preceding word is the indeclinable part of speech), the keys of nominative 331 and objective 332 of the function keys for "ga" on the function keyboard are blinked to request the operator's selection (step 404). The operator determines whether the "ga" means nominative or objective, by interpreting the Japanese text (step 405), and hits one of the function keys 331 and 332 depending on the selection (step 406 or 407). Examples of the reasons for the operator's decisions are provided in FIG. 4b.

For the Japanese text Example D in FIG. 4b inputted at the step 401, the words 'jidousha' which car) which immediately precedes to "ga" is treated as a nominative since 'jidousha' is memorized as a substantive part of speech in the dictionary 5a (step 408). In case of Example E, the word immediately preceding "ga" is treated as an objective (step 409). In the step 403, if the word immediately preceding to the "ga" is an end-form of a declinable part of the keys of conjunction 333 and counter-conjunction 334 of the function keys for "ga" on the function keyboard are blinked to request operator's selection (step 410). The operator determines whether the "ga" means a simple conjunction or a counter-conjunction (step 411). In Example F, the operator determines that the "ga" is the simple conjunction by interpreting two simple clauses before and after the "ga" and 'and' will be used as conjunction for those two clauses in the English generation stage (step 414). In Example G, English clauses before and after "ga" will be connected with "but" or "however" (step 415).

The present embodiment is now explained with reference to FIGS. 1-4.

In Japanese-English machine translation, manpower is saved and the translation speed is faster, whenever the input method is simple, that is, when important comments are inputted as the translation information for the Japanese text in the pre-editing prior to the translation work, rather than when the English text is corrected in the post-editing on the output of the result of translation. The application field of the function keyboard in machine translate on includes the work mode, the style mode and Japanese text input supplementary information. For the work mode and the style mode, the selection is done by the illuminated function key so that the operator can easily recognize it during the work.

When a switch of the translation machine is turned on, the function keys of the Japanese text input 11, English text output 12 and dictionary 13 on the function keyboard 6 start blinking simultaneously to request the operator's selection. When the operator wants to input or pre-edit the Japanese text, the operator hits the Japanese text input key 11. The depressed key is kept illuminated until the work is terminated or the other work mod. key is selected, to indicate that the machine is running under that mode.

The style mode 20 is provided for the operator's selection of whether the style will be technical manual style or ordinary style or any other style provided in spare key(s). The manual key 21 and the ordinary key 22 start blinking in the pre-editing of the Japanese text input mode 11 or in the English text output mode 12 is selected. When the translation in the technical manual style is desired, the operator hits the manual key 21. As a result, the English text in the manual style is outputted. For example, if the manual style 21 is selected a Japanese text "—wo kaishi shitekudasai." which shall be translated as "Please start—" in the ordinary style in English text, will be translated as "Start—" (without "Please") in the manual style. Once the manual key 21 is hit, it is kept illuminated until the ordinary key 22 or the other key of style mode key is hit to change the style mode 20 or any of the other work mode key 11, 12, 13 is selected or the job is terminated.

A legal style may be selected as the spare 23. There are many sentences in a Japanese text which end with "—subeshi.". It is expressed in the ordinary style of English text as "should or must" but usually expressed as "shall" in the legal style.

When an ordinary noun is to be treated as plural by the Japanese text input supplementary information, the plural-key 311 (see FIG. 2) is used. When a hint of singular/plural of the noun is directly mentioned in the Japanese sentence such as "1-ko no neji", "Neji 4-hon" or "Nanbon kano neji" (step 303), the singular or plural form of the noun in English can be correctly generated in the English text by analyzing the Japanese text (see Examples A and B in FIG. 3b) so that the operator is not requested to select singular or plural. On the other hand, in Example C of FIG. 3b, "Enjin kara supaaku puragu wo nukitoru", there is no direct hint of singular/plural in "Enjin" or "supaaku puragu". Accordingly, the operator has to determine whether singular or plural of the nouns are appropriate (step 308 in FIG. 3a) Assuming "Enjin" is a singular and "supaaku puragu" is a plural, the word "Enjin" on the screen of the CRT 1 is highlighted (or reversibly highlighted) in the pre-edit mode for the Japanese text so that it is indicated as an object word, and the plural key 311 starts blinking. This means that the selection by the operator is requested because it is recognized that the "Enjin" does not have a hint of singular/plural. Thus, the operator hits the space bar to singularize (step 309). The blinking of the plural-key 311 is stopped at this moment, and "Enjin" is treated as singular in the generation of the English sentence. Next, "supaaku puragu" on the screen of the CRT 1 is highlighted and the plural-key 311 again starts blinking. The operator hits the plural-key 311 to pluralize. As soon as the plural-key 311 is hit (step 370), the plural key 311 is kept illuminated for approximately 1–2 seconds and then the illumination is turned off to indicate to the operator the acceptance of the instruction by the computer. Simultaneously "(−S)" is displayed immediately after "supaaku puragu" in the Japanese text (like "supaaku puragu-S) in the pre-edit work area on the CRT screen 1. The program of the machine translation is designed that the noun is highlighted for the determination of singular or plural only when the English noun corresponding to the Japanese noun is a countable noun and no direct hint of singular/plural of the noun in the same sentence exists (See input Example C and output Examples C and C' in FIG. 3a).

Treating sex of a noun is now discussed. Male nouns and female nouns are not frequently used in the Japanese-English translation, but when a name of a person appears in the text, the operator may designate the sex of the person so that the English translation is accurately generated. When a noun in the Japanese text is to be designated as male or female, the noun is highlighted on the CRT screen 1 and the operator hits either the male-key 312 or the female-key 313.

For example, for a Japanese sentence "Noguchi Hideyo wa idaina kagakusha de kono hito no—", the operator highlights the words "Noguchi Hideyo" (i.e., the person's name) CRT screen 1 and hits the male-key 312 which starts blinking with female-key. Thus, the male key 312 is illuminated for 1-2 seconds and "Noguchi Hideyo (M) wa idaina—" is displayed in the pre-edit text on the CRT screen 1. As a result, "his" is selected in the English text corresponding to "kono hito no" (which literally means "this person's). The designation may be made to not only the persons' name but also to a person.

The illuminated-function-keys 321 in FIG. 2 are used to select a particular meaning of a Japanese particle (joshi) which has plural meanings which make it difficult to analyze by a computer. There are approximately 60 particles (joshis) which are used in a colloquial style Japanese text. Approximately 40 of these particles have plural meanings. The meaning of several particles, however, is automatically limited to one by analyzing the part of speech of the preceding word, inflection or a verb which governs the particle. However, since there are particles, whose meanings cannot automatically be determined without understanding the meaning of the whole sentence or background, the input of supplementary information request to the operator is issued in such a case. For example, the particle "ga" is explained as follows (see FIG. 4). The particle "ga" has 4 meanings of nominative, objective, conjunction and counter-conjunction. Checking the word immediately preceding 'ga' limits the meaning to nominative or objective when the preceding word is substantive (including quasi-substantive), and to conjunction or counter-conjunction when the preceding word a declinable part of speech.

Whether the 'ga' means nominative or objective, conjunction or counter-conjunction cannot be understood unless the computer knows the meaning of the sentence, which cannot be achieved within a short period under the present technology. In the two sentences "D. Jidousha ga hashiru" and "E. Jidousha ga hoshii" shown in FIG. 4b, the preceding words in both cases are substantive parts of speech, and it is difficult for the computer to determine whether "ga" represents the nominative or the objective as mentioned above. In this case, "ga" in the pre-edit text on the CRT screen 1 is highlighted and the nominative-key 331 and the objective-key 322 start blinking to request the operator's selection (step 404). When "ga" represents the nominative, the operator hits the nominative-key 331 (steps 405 and 406). The illumination of the objective-key 322 is turned off at this key operation, and the illumination of the nominative-key 331 is kept on for 1-2 seconds and then turned off. "(N)" is displayed immediately after "ga" in the pre-edit text on the CRT screen 1 so that "ga" is to be treated by the computer as a nominative particle. For the text of E, the objective-key 332 is hit for the Japanese text to generate the English sentence. In the t of Example "F. Jidousha mo hoshii ga kaigairyokou shitai", "ga" represents a simple conjunction (which replaceable by a Japanese particle "shi"), and in text of Example "G. Jidousha wo hoshii ga okanega nai", "ga" is used as the counter-conjunction. The distinction between these used of "ga" is not attainable by only grammatical analysis. When the preceding word to "ga" is an end-form of a declinable part of speech, "ga" is restricted to either the simple conjunction or the counter-conjunction, and the conjunction-key 333 and the counter-conjunction-keys 334 are blinked, and "ga" in the CRT screen 1 is also highlighted. The operator then hits the selected key to supplement the information (steps 411 and 412 or 413).

In another embodiment, no special function key is provided, but ten-keys (numerical keys on the keyboard) are used to designate the selection.

For example, instead of the designation of singular/plural being done with the plural-key 311, another designation method would be using a message on a CRT screen and ten-keys. In the pre-editing screen, message from the computer is displayed as "Highlighted noun is unclear about singular/plural. Designate by numerical key 1—singular, 2—plural" in a specified area (for example, the bottom) of the screen on which the noun in the pre-edit Japanese text is highlighted. The operator hits the key 1 or 1 of the ten-keys to designate singular or plural. To select a suitable meaning among the plural meanings of the particle the examples of use and the meanings may be displayed with numbers on the CRT screen 1 so that the operator selects the suitable one by hitting one of the ten-keys. For example, in the text of Examples F and G, "ga" on the CRT screen 1 is highlighted and the following message is displayed on the specified area as "meaning of high-lighted particle "ga" is not clear. Select one of the following by a numerical key. —simple conjunction (=—shi, =and) example: Watashi wa kou omou ga, sensei mo sansei shita 2—counter-conjunction (=—shikashi, =but /however) example: Taro wa hatarakimono da ga, Jiro wa namakemono da.". The operator hits 1 or 2 of the ten-keys for selection.

In the other embodiment of the present invention, the function-keyboard 6 may be used to designate a field in which the text is used. The English words equivalent to a particular Japanese word may differ from field to field where it is used. When dictionaries for various fields are prepared and the field is designated, an optimum translation into English can be generated. The supplement of information may also be achieved by a combination of the display on the CRT screen 1 and a light pen or a voice recognition system.

While the Japanese-English translation was specifically described in the above embodiments, the present invention can be easily applied to the translation between other languages.

In accordance with the present embodiment, simple and easy-to-understand pre-editing is attained; and the operability in the machine translation is improved. Even when the original text lacks the information which is necessary for the translation (for example, singularize/pluralize a noun) or has an unclear expression (for example, a multi-meaning particle), by supplementing the translation information at the pre-editing stage with simple key strokes mistranslation in the generated text due to such causes will be avoided. Accordingly, by virtue of the present invention direct correction (for example, addition of "S" for pluralization of a noun) and indirect correction (for example, deletion of an indefinite article, inflexion of a verb, pluralization of a pronoun, etc., due to pluralization of noun) at the post-editing stage to the outputted text are not necessary. Thus, the number of key strokes for correction or supplementation in the pre-editing and the post-editing stages is reduced by ½ to 1/10.

We claim:

1. A method for supplementing translation information for a translation machine for sentences, wherein the translation machine includes a CPU and a memory storing a translation dictionary and translation rules and grammar used to translate the sentences of a first language text to a second language text, a keyboard for inputting characters, numbers and symbols, a function-keyboard including means for indicating a type of information necessary for a translation but not directly expressed in the first language text, and a displaying device for displaying a translated text and information necessary for the translation, comprising the steps of:
   (a) detecting by the CPU ambiguous portions regarding number or sex of a noun or meaning of a particle in the first language text;
   (b) checking by the CPU if said ambiguous portions can be interpreted by analyzing expressions of the first language text before or after said ambiguous portions detected by the CPU;
   (c) displaying possible candidates for a translation regarding number or sex of a noun or meaning of a particle on the displaying device when it is determined by the CPU that said ambiguous portions cannot be completely interpreted by the CPU; and
   (d) generating a translation corresponding to said ambiguous portions in response to an operator's selection by said keyboard of one of said displayed candidates.

2. A method for supplementing translation information according to claim 1, wherein said first language text is Japanese.

3. A method for supplementing translation information according to claim 2, wherein said second language text is English.

4. A method for supplementing translation information according to claim 1, wherein supplementing of the information is done by single stroke of a key on said keyboard to select one of the candidates.

5. A method for supplementing translation information according to claim 1, wherein said generated translation is provided through a process of pre-editing of the first language text inputted to the translation machine made in said translation machine.

6. A method for supplementing translation information according to claim 5, wherein said first language text is Japanese.

7. A method for supplementing translation information according to claim 6, wherein said second language text is English.

8. A method for supplementing translation information for a translation machine wherein the translation machine includes a CPU and a memory storing a translation dictionary and translation rules and grammar used to translate a Japanese text to a second language text, a keyboard for inputting characters, numbers and symbols, a function-keyboard including means for indicating a type of information necessary for a translation but not directly expressed in the Japanese text, and a displaying device for displaying a translated text and information necessary for the translation, comprising the steps of:
   (a) detecting by the CPU ambiguous portions regarding number or sex of a noun or meaning of a particle of the Japanese text;
   (b) checking by the CPU if said ambiguous portions can be interpreted by analyzing expressions of the Japanese text before or after said ambiguous portions detected by the CPU;

(c) displaying possible candidates for a translation regarding number or sex of a noun or meaning of a particle on the displaying device when it is determined by the CPU that said ambiguous portions cannot be completely interpreted by the CPU; and
(d) generating a translation corresponding to said ambiguous portions in response to an operator's selection by said keyboard of one of said displayed candidates.

9. A method for supplementing translation information according to claim 8, wherein said second language text is English.

10. An apparatus for supplementing translation information for a translation machine for sentences including:
   a CPU:
   a memory connected with said CPU for storing a translation dictionary and translation rules and grammar used to translate the sentences of a first language text to a second language text;
   a keyboard for inputting characters, numbers and symbols;
   a function-keyboard connected with said CPU and including means for indicating a type of information necessary for a translation but not directly expressed in the first language text; and
   a displaying device for displaying a translated text and information necessary for the translation,
   wherein said CPU includes:
      means for detecting ambiguous portions regarding number or sex of a noun or meaning of a particle in the first language text to check if said ambiguous portions regarding singular/plural form of a noun, male/female form of a noun, or meaning of a particle can be interpreted by analyzing expressions of the first language text before or after said ambiguous portions;
      means for displaying on said displaying device possible candidates for a translation regarding number or sex of a noun or meaning of a particle when it is determined by the CPU that said ambiguous portions cannot be completely interpreted by the CPU; and
      means for generating a translation corresponding to said ambiguous portions in response to an operator's selection through said keyboard of one of said candidates.

11. An apparatus for inputting translation information according to claim 10, wherein said keyboard has a key for selecting one of the candidates with a single stroke f said key.

12. An apparatus for inputting translation information according to claim 10, wherein the first language text is Japanese.

13. An apparatus for inputting translation information according to claim 12, wherein the second language text is English.

14. A method for supplementing translation information for a translation machine for sentences, wherein the translation machine includes a CPU and a memory storing a translation dictionary and translation rules and grammar used to translate the sentences of a first language text to a second language text, means for inputting characters, numbers and symbols, a function-keyboard including function keys for indicating a type of information necessary for a translation but not directly expressed in the first language text, and a displaying device for displaying a pre-edit text of the first language text and information necessary for the translation, comprising the steps of:
   (a) detecting by the CPU ambiguous portions regarding number or sex of a noun or meaning of a particle in the first language text;
   (b) checking by the CPU if said ambiguous portions can be interpreted by analyzing expressions of the first language text before or after said ambiguous portions detected by the CPU;
   (c) indicating on the display device said ambiguous portions of said pre-edit text regarding number or sex of a noun or meaning of a particle if the ambiguous portions cannot be completely interpreted by the CPU;
   (d) illuminating predetermined function keys in said function keyboard to provide an operator with possible candidates for a translation of said ambiguous portions of said pre-edit text indicated on the display device; and
   (e) generating a translation corresponding to said ambiguous portions in response to the operator's selection of one of said candidates by selecting one of said illuminated function keys.

15. A method for supplementing translation information according to claim 14, wherein said first language text is Japanese.

16. A method for supplementing translation information according to claim 15, wherein said second language text is English.

17. An apparatus for supplementing translation information for a translation machine for sentences including:
   a CPU:
   a memory connected with said CPU for storing a translation dictionary and translation rules and grammar used to translate the sentences of a first language text to a second language text;
   keys for inputting characters, numbers and symbols;
   a function-keyboard including function keys for indicating a type of information necessary for a translation but not directly expressed in the first language text; and
   a displaying device for displaying a pre-edit text of the first language text and information necessary for the translation,
   wherein said CPU includes:
      means for detecting ambiguous portions regarding number or sex of a noun or meaning of a particle in the first language text to check if said ambiguous portions can be interpreted by analyzing expressions of the first language text before or after said ambiguous portions;
      means for indicating on the display device said ambiguous portions of said pre-edit text regarding number or sex of a noun or meaning of a particle if the ambiguous portions cannot be completely interpreted by the CPU;
      means for illuminating predetermined function keys in said function keyboard to provide an operator with possible candidates for a translation of said ambiguous portions of said pre-edit text indicated on the display device; and
   means for generating a translation corresponding to said ambiguous portions in response to the operator's selection of one of said candidates by selecting one of said predetermined illuminated function keys.

18. An apparatus for inputting translation information according to claim 17, wherein said function-keyboard has a key for accepting a single stroke to select one of the candidates.

19. An apparatus for inputting translation information according to claim 17, wherein said first language text is Japanese.

20. An apparatus for inputting translation information according to claim 19, wherein said second language text is English.

21. A method for supplementing translation information according to claim 1, wherein said translation is generated by adding information not included in the first language text to be used by the CPU in translating the first language text to generate said translation.

22. A method for supplementing translation information according to claim 8, wherein said translation is generated by adding information not included in the first language text to be used by the CPU in translating the first language text to generate said translation.

23. An apparatus for inputting translation information according to claim 10, wherein said translation is generated by adding information not included in the first language text to be used by the CPU in translating the first language text to generate said translation.

24. A method for supplementing translation information according to claim 14, wherein said translation is generated by adding information to the first language text to be used by the CPU in translating the first language text to generate said translation.

25. An apparatus for supplementing translation information according to claim 17, wherein said translation is generated by adding information to the first language text to be used by the CPU in translating the first language text to generate said translation.

* * * * *